(12) United States Patent
Ganev et al.

(10) Patent No.: US 7,593,243 B2
(45) Date of Patent: Sep. 22, 2009

(54) INTELLIGENT METHOD FOR DC BUS VOLTAGE RIPPLE COMPENSATION FOR POWER CONVERSION UNITS

(75) Inventors: Evgeni Ganev, Torrance, CA (US);
William H. Warr, Glendale, CA (US);
Edward L. Johnson, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 390 days.

(21) Appl. No.: 11/539,871

(22) Filed: Oct. 9, 2006

(65) Prior Publication Data

US 2008/0084716 A1    Apr. 10, 2008

(51) Int. Cl.
*H02M 1/14* (2006.01)
(52) U.S. Cl. .......................................... 363/44; 363/72
(58) Field of Classification Search .................... 363/36, 363/40, 44, 65, 67, 71, 72
See application file for complete search history.

(56) References Cited

U.S. PATENT DOCUMENTS

| 3,832,622 | A | 8/1974 | Compoly |
| 4,733,341 | A | 3/1988 | Miyazawa |
| 4,967,333 | A | 10/1990 | Callier et al. |
| 5,132,892 | A | 7/1992 | Mizoguchi |
| 6,285,572 | B1 | 9/2001 | Onizuka et al. |
| 6,819,577 | B1 | 11/2004 | Wiktor et al. |
| 6,856,038 | B2 * | 2/2005 | Rebsdorf et al. ............... 290/44 |
| 7,075,267 | B1 * | 7/2006 | Cheng ......................... 318/807 |
| 7,176,648 | B2 * | 2/2007 | Choi ........................... 318/625 |
| 7,466,086 | B2 * | 12/2008 | Kiuchi et al. ................. 318/41 |
| 2003/0137856 | A1 | 7/2003 | Sheng et al. |
| 2009/0041169 | A1 * | 2/2009 | Fujita et al. .................. 375/354 |

* cited by examiner

*Primary Examiner*—Adolf Berhane
(74) *Attorney, Agent, or Firm*—Oral Caglar, Esq.

(57) ABSTRACT

A power conversion system having a DC power distribution bus includes multiple power converters connected to the DC power distribution bus with modulation frequencies synchronized so that providing phase shifts between the different modulations has the effect of compensating voltage and current ripples, e.g., reducing voltage fluctuations, across the DC bus. Power conversion may be controlled using space vector modulation implemented, for example, by any of a variety of pulse width modulation schemes. Phase shifts in which nulls of the modulation cycles of different converters do not overlap (in the time domain) may be particularly effective for DC bus voltage ripple compensation. The novel method for DC bus voltage ripple compensation may be implemented by programming a digital signal processor to control the power converters.

16 Claims, 11 Drawing Sheets

INTELLIGENT METHOD FOR DC BUS VOLTAGE RIPPLE COMPENSATION FOR POWER CONVERSION UNITS

BACKGROUND OF THE INVENTION

The present invention generally relates to electrical power conversion and, more particularly, to synchronizing the chopping frequency of multiple power converters and providing a phase shift to control voltage ripple across the DC bus.

The electronics for supplying power in aerospace applications plays a significant role in the modern aircraft and spacecraft industry. This is particularly true in the area of more electric aircraft or more electric architecture (MEA) for aircraft and military ground vehicles. MEA includes, for example, a concept called "power-by-wire," in which electrical power moves (i.e., "actuates") aircraft flight control surfaces such as rudder and aileron. MEA can eliminate the complex, heavy, maintenance-intensive, and (in combat) vulnerable hydraulic systems with their flammable liquids operating at high temperature and pressure. Using MEA, the weight of miles of tubing, the pumps, and valves can be shifted from plumbing to passengers, fuel or mission payloads.

The commercial aircraft business is moving toward non-bleed air environmental control systems (ECS), variable-frequency (VF) power distribution systems, and electrical actuation. Typical examples are the latest designs, such as the Boeing 787 and the Airbus super jumbo A380. The next-generation Boeing airplane (replacement of 737) and the Airbus airplane (replacement for the A320) will most likely use MEA. Some military aircraft already use MEA, including primary and secondary flight control. Military ground vehicles have migrated toward hybrid electric technology where the main propulsion employs electric drives.

These developments have resulted in a substantial demand for electrical power conversion. For example, non-bleed air environmental control systems need additional electric drives for vapor cycle system (VCS) compressors, condenser fans, and liquid pumps. Also, a large number of electric drives for fans is required. In constant-frequency applications, these fans have predominantly used direct drive (i.e., no power electronics) to an induction machine. The new architecture presents a need for double power electronics conversion ac-to-dc and dc-to-ac. In addition, auxiliary power unit (APU) and main engine electric start impose a need for high-power, multiple-use electric power controllers. Moreover, military aircraft require high-voltage (270-Vdc) power conversions multiple times, for example, from generator power to power for electric flight controllers and utilization. Furthermore, military ground vehicles have moved toward a higher voltage power distribution system where high-power bidirectional propulsion is being used for driving and dynamic braking. The power generation is typically achieved by a main engine shaft driving one or more large electric machines, requiring bidirectional conversion for power conditioning and self-starting.

In summary, there is a need for power converters and motor controllers for aircraft and ground military and commercial applications for: 1) increased power level conversion capabilities to handle increased loads; 2) reduced controller weights to be able to accommodate large power electronics content increase per platform; 3) reduced volume to accommodate electronics housings in limited compartment space; 4) increased reliability for achieving reasonable mission success; and 5) reduced cost for affordability.

A switching type power electronics converter requires a low-impedance source in close proximity to high power switched modules (HPSM) in order to provide proper operation. A capacitance bank connected in parallel with the direct current (DC) bus performs the function of providing the low-impedance. In some cases more than one capacitor is used to achieve a better distribution of the low impedances across the switching devices. The selection of the value of these capacitors primarily depends on the magnitude of the switched currents and the switching frequency. The capacitor bank experiences charging and discharging cycles, which are synchronous with the switching period. These charging and discharging cycles create voltage ripple across the bus capacitor, i.e., capacitance bank, due to the source impedance, distribution bus impedance and the electromagnetic interference (EMI) filters. The ripple amplitude also depends on the duty cycle of the converter, which is directly related to the loading. The voltage ripple across the capacitance bank creates two negative effects: 1) capacitor alternating current (AC) that creates undesired heating and 2) EMI radiated and conducted emission effect. These effects can be controlled by reducing the voltage ripple and are required to be controlled for the system to meet specifications. Thus, reduction of the voltage ripple is a useful result.

As can be seen, there is a need for a method for DC bus voltage ripple compensation to reduce voltage ripple for power conversion units. A voltage ripple compensation method is needed that improves performance, reduces cost, reduces weight and volume, and improves reliability.

SUMMARY OF THE INVENTION

In one embodiment of the present invention, a power conversion system, having a DC power distribution bus, comprises at least two converters, each connected to the DC power distribution bus; a first controller connected to a first of the two converters and controlling the first converter using space vector modulation; a second controller connected to a second of the two converters and controlling the second converter using space vector modulation, in which: the second controller space vector modulation frames are synchronized to the first controller space vector modulation frames; and the second controller space vector modulation frames are phase shifted relative to the first controller space vector modulation frames.

In another embodiment of the present invention, a method of compensating voltage ripple comprises the steps of: synchronizing a modulation frequency for at least two converters, both converters being connected to a DC power distribution bus; and phase shifting the modulation frames for a first of the two power converters relative to a second of the two power converters so that DC bus voltage ripple is controlled.

In still another embodiment of the present invention, a method for power conversion on a DC power distribution bus comprises converting power at a first connection to the bus; converting power at a second connection to the bus; synchronizing the power conversion at the second connection to the power conversion at the first connection; and phase shifting the power conversion at the second connection by a non-zero amount to be out of phase with the power conversion at the first connection.

These and other features, aspects and advantages of the present invention will become better understood with reference to the following drawings, description and claims.

DETAILED DESCRIPTION OF THE INVENTION

Figure 1:
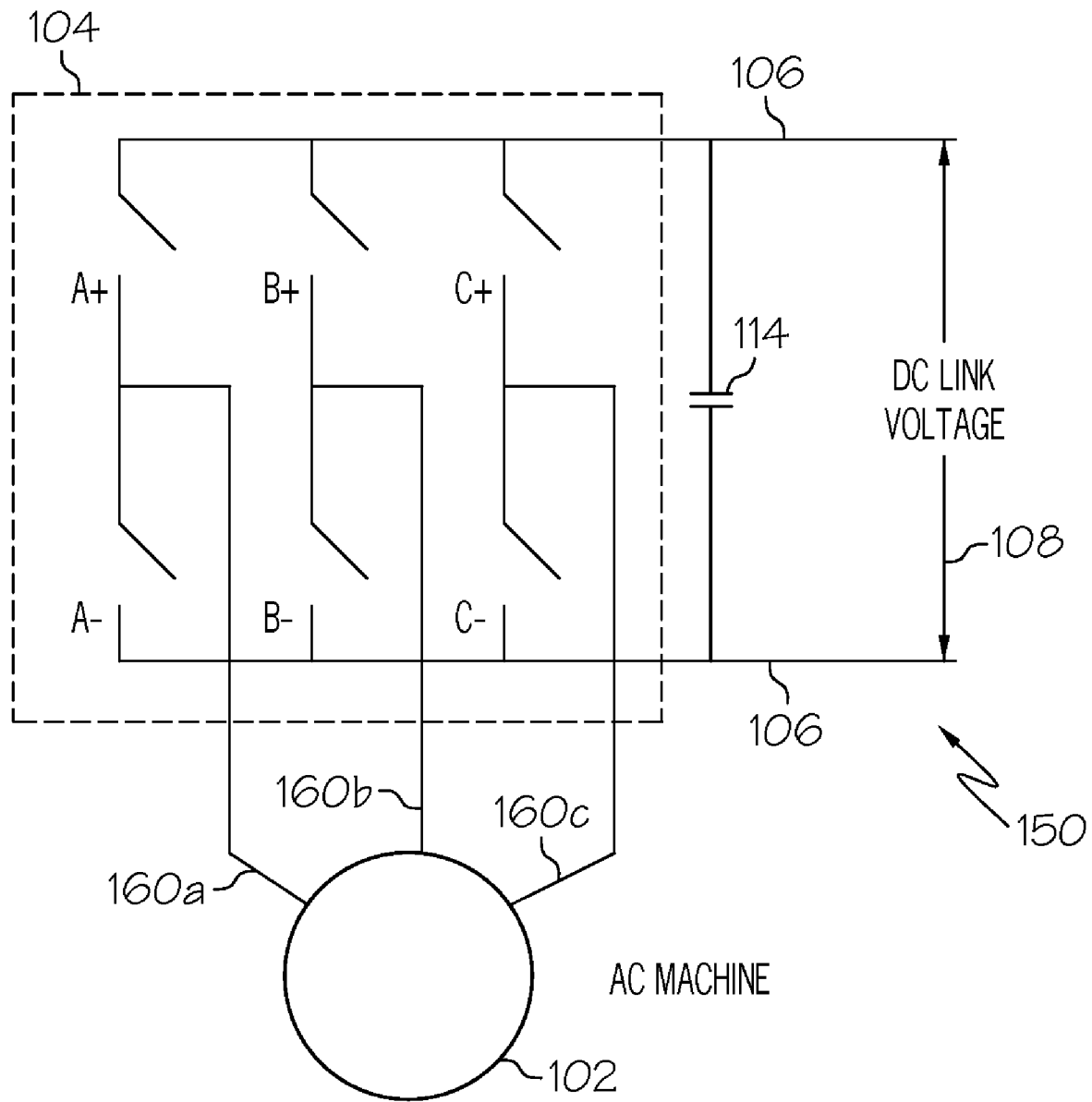
FIG. 1 is a schematic diagram of an AC machine connected by a three-phase converter to a DC bus in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide DC bus voltage ripple compensation for multiple electric power converters that are all connected to the same DC power distribution bus, and can be applied in any situation where such electrical power conversion can be used. Some example applications are electrical power conversion for commercial and military aircraft and electrical power conversion for military ground vehicles.

Embodiments of the present invention may be applicable to multiple power converters using the same DC distribution bus. DC bus voltage ripple compensation according to an embodiment of the present invention may require the converters to have identical modulation frequencies, i.e., one modulation frequency shared by all converters. The modulation periods can thus be synchronized together, providing the ability to phase shift the modulation period of each converter in relation to the others. Embodiments of the invention may synchronize the modulation frequency (also called "chopping frequency") of the converters and provide the required phase shift to reduce the voltage ripple across the DC bus leading to substantial advantages. For example, with embodiments of the present invention synchronization may be implemented to digital signal processor or some other device not specifically a pulse width modulation controller; any combination of different power converters on the same bus may be used; any phase shift between any converters may be implemented; variable phase shifting based on loading and other conditions may be implemented; reduced capacitance bank size and EMI filter components may reduce weight, volume, cost, and overall weight and volume from chassis and mounting hardware; EMI signature, power quality, and reliability may be improved due to reduced operating temperature of the capacitor bank resulting from minimized voltage ripple at all times.

There are a great variety of pulse width modulation schemes for realizing the space vector modulation used for power conversion by the embodiments described. Each pulse width modulation scheme or combination of schemes may need a specific implementation approach. The commonality between all the pulse width modulation compensation approaches is the phase shift between the converters. In some applications the phase shift remains constant; in others the phase shift may be constantly adjusting based on various criteria. The use of space vector modulation and phase shifting of the modulation periods to provide DC bus voltage ripple compensation stands in contrast to the prior art which typically only uses the capacitance bank or other ripple filtering across the power distribution bus to reduce DC bus voltage ripple. In contrast to prior art systems that supply only one type of PWM signals to all controllers, an embodiment of the present invention may provide synchronization and phase shifting between converters with different PWM modulation schemes in the same system and reduce the voltage ripple across the supply bus.

FIG. 1 illustrates system 150 exemplifying an AC machine 102 connected by a three-phase converter 104 to a DC power distribution bus 106 (more briefly, "bus") in accordance with one embodiment. A DC link voltage 108 may be measured across bus 106 as shown by the arrows in FIG. 1. Converter 104 may comprise switches A+, B+, C+, A−, B−, C−, as labeled in FIG. 1. Each of the switches A+, B+, C+, A−, B−, C− may comprise various electronic components—such as diodes and power switching transistors, e.g., power metal oxide semiconductor field effect transistors (power MOSFET)—that are controllable to effect switching on and off of each of the switches A+, B+, C+, A−, B−, C− individually and independently of each other to provide power conversion between AC machine 102 and bus 106. For example, AC machine 102 may be a source—such as a generator—providing a three-phase voltage at its (output) terminals 160a, 160b, and 160c, so that converter 104 acts as an AC-to-DC converter (or active rectifier) to provide DC power to bus 106. Conversely AC machine 102 may be a load—such as a motor—so that converter 104 acts as an DC-to-AC converter (or inverter) to provide power from bus 106 as AC power to machine 102 at its (input) terminals 160a, 160b, and 160c. Switches A+, B+, C+, A−, B−, C− may be connected to a controller (not shown in FIG. 1) that may employ, for example, a digital signal processor to control switches A+, B+, C+, A−, B−, C− using space vector modulation (SVM) implemented, for example, by a pulse width modulation (PWM) scheme. System 150 may also include a DC bus capacitor 114 connected across bus 106 as shown. DC bus capacitor 114, for example, may be part of a capacitance bank or other ripple filtering across the power distribution bus 106 to reduce fluctuations in the DC link voltage 108—such fluctuations may also be referred to as "DC bus voltage ripple".

Figure 2:
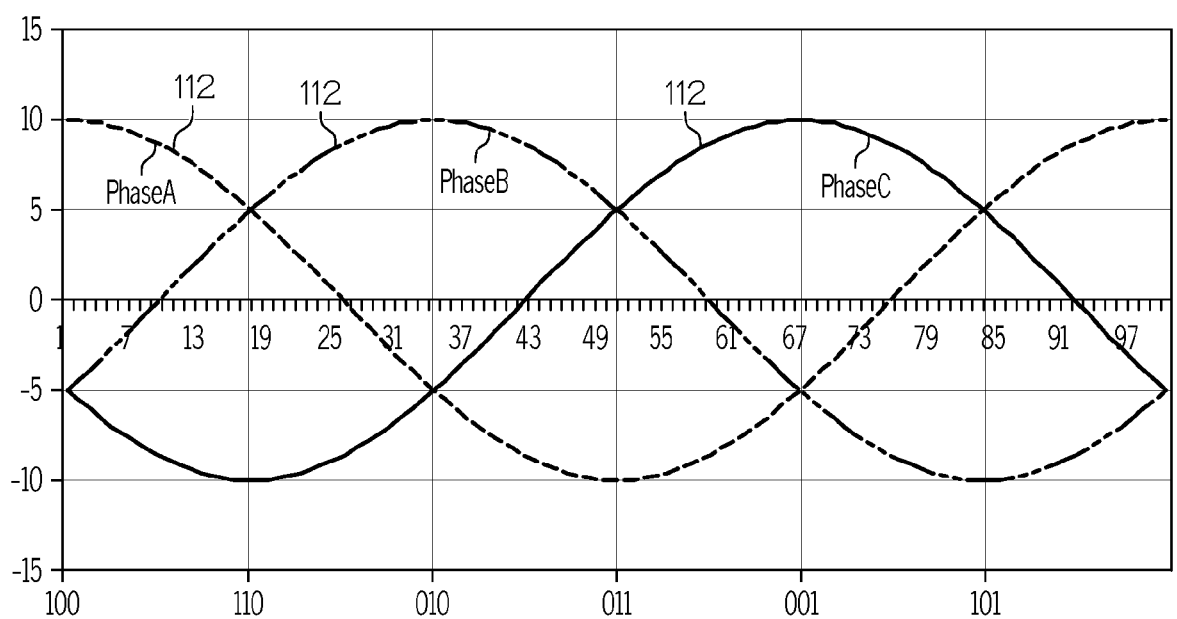
FIG. 2 is a voltage-time diagram showing three-phase voltage waves and the corresponding converter vector states in accordance with the embodiment of FIG. 1.

FIG. 2 shows the three-phase voltage waveform 112 occurring at terminals 160a, 160b, and 160c in FIG. 1. Phase A occurs at terminal 160a, Phase B at 160b, and Phase C at 160c. FIGS. 1 through 4 are used to illustrate an example using three-phase space vector modulation under the assumption that converter 104 may be an inverter. Inverter SVM schemes may approximate three-phase voltages by using high frequency (e.g., between about 10 kiloHertz (kHz) and about 40 kHz) modulation of DC link voltage 108 using its six spatial voltage vectors 120, 121, 122, 123, 124, and 125 shown in FIG. 3.

Figure 3:
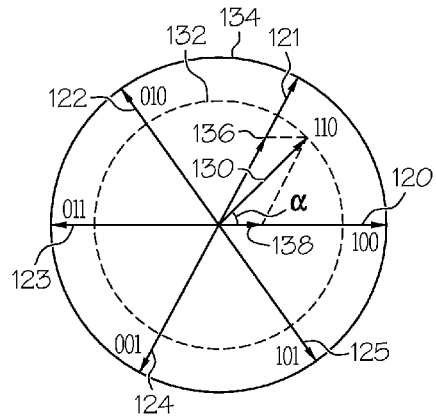
FIG. 3 is a phase-state diagram corresponding to the diagram of FIG. 2.

Spatial voltage vector 120 may be referenced as state 100, vector 121 as state 110, and so forth as shown in FIG. 3. The various vector sectors—i.e. a portion of the phase space between any two of the states 100, 110, 010, 011, 001, and 101—each represent 60 degrees (or $\pi/3$) of electrical travel in the phase space of FIG. 3. The states 100, 110, 010, 011, 001, and 101 refer to the condition of the converter (inverter) 104 upper switch phase of the A, B, and C phase legs as shown in FIG. 1. A one means the switch is ON, and a zero means it is OFF. Only one switch can be on in each leg without shorting the bus 106 so that the lower switch of each respective phase leg must simply be the opposite of the upper leg. Thus, for example, the state 100 indicates that switch A+ is ON, switch B+ is OFF, switch C+ is OFF and that switch A− is OFF, switch B− is ON, and switch C− is ON. FIG. 2 shows the position (in time) in the three-phase waveform 112 of the six inverter spatial vectors 100, 110, 010, 011, 001, and 101, while FIG. 3 shows the position (in phase space) of the same six space vectors.

FIG. 3 shows a representation of an inverter voltage vector 130 having angle $\alpha$ and lying between vectors 100 and 110. Space vector modulation can be used to modulate—at a frequency matching the controller's pulse width modulation update rate, which be in the range of 10-40 kHz, for example—a combination of both the 100 and 110 states as a duty cycles over a PWM period. The amount of time spent in each state may be a function of the represented angle, e.g., angle $\alpha$ of vector 130. A voltage vector lying between adjacent inverter vectors can be approximated by controlling the application time of the two adjacent vectors. For example, the angle $\alpha$ of voltage vector 130 may be approximated by controlling the application times of vector 100 and vector 110.

The magnitude of vector 130 can be controlled by the addition of inverter null vectors 111 and 000. These null states can reduce the overall vector magnitude of the vector 130 formed by combining adjacent vectors 100 and 110. The null states can be used, for example, to accommodate various vector magnitudes and fitting the desired rotating vector, e.g., vector 130, onto a circle, e.g., circle 132. The maximum phase voltage that can be formed by an inverter may be determined by the DC link voltage 108. If a circle is to be kept, the peak phase voltage, e.g., at circle 134, may be approximately 0.557× the DC link voltage 108. Generally, the controller has the desired voltage vector coordinates, e.g., of vector 130, referenced to a pair of normal vectors, e.g., 100, 110. The controller may use simple trigonometric transformations to find the particular vector projections, e.g., vectors 136, 138, on the 100 and 110 vectors of the inverter. The controller may use the vector projections, i.e., vectors 136, 138, to find a ratio to calculate the duty cycles for the two states 100, 110 in order to approximate vector 130 using pulse width modulation.

Figure 4:
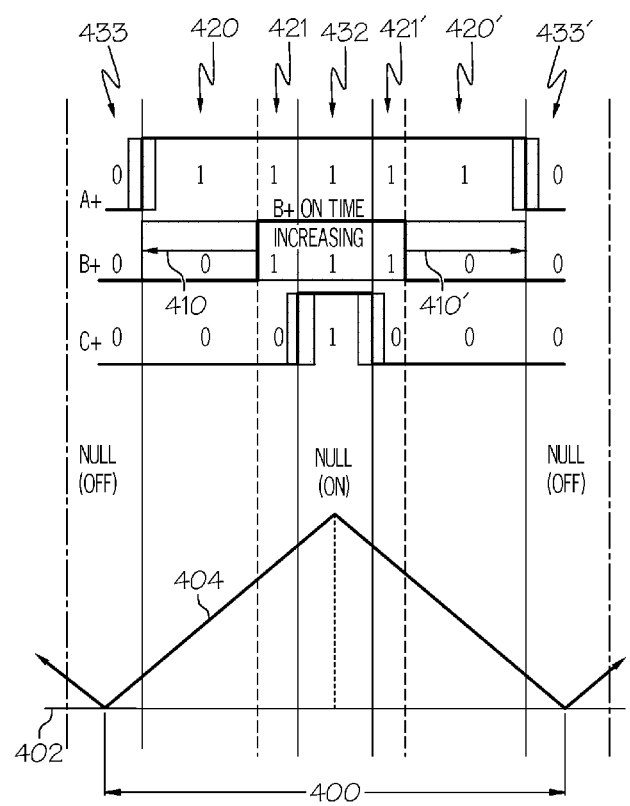
FIG. 4 is a voltage-time diagram showing one modulation cycle for space vector modulation corresponding to the diagram of FIG. 3.

FIG. 4 shows one modulation cycle 400 for a pulse width modulation scheme that accommodates the space vector modulation corresponding to the diagram of FIG. 3. The modulation cycle 400 may also be referred to as a modulation period 400 or a modulation frame 400. The horizontal axis 402 in FIG. 4 represents time. The frequency and phase of the modulation cycle 400 may be defined by the triangular waveform 404. Such a waveform 404 may be generated for each of a plurality of converters 104 connected to a DC bus 106. The resulting plurality of waveforms 404 may be synchronized, for example, by a single clock source (not shown in FIG. 4) and accurate phase shifting between multiple instances of waveform 404 may thereby be maintained.

FIG. 4 graphically shows the inverter 104 switch conditions for switches A+, B+, and C+. The inverter switch conditions shown may represent a vector, such as vector 130, lying between the 100 and 110 vectors (vectors 120, 121 in FIG. 3). Thus, a portion 420 and 420' of period 400 may be spent in state 100, as indicated in FIG. 4 by the relative heights of the waveforms at A+, B+, and C+ and the 1, 0, and 0 indicators at portions 420, 420'. Similarly, a portion 421 and 421' of period 400 may be spent in state 100 as indicated. The relative length of time between states 100 and 110 out of period 400 spent in each state may control the angle $\alpha$ of vector 130. The relative length of time spent in each state may be changed from one modulation frame 400 to the next as the modulation frames follow each other sequentially as time passes.

For example, if the B+ on-time is increased at the next modulation period 400, as indicated by the direction of arrows 410 and 410', more time out of the new period 400 may be spent in state 110 (portion 421, 421' increases) while concomitantly less time out of period 400 may be spent in state 100 (portion 420, 420' decreases) so that vector 130 may move closer to vector 121 (state 110) and angle $\alpha$ increases. The effect may be opposite, of course, if B+ on-time is decreased, with vector 130 moving closer to state 100 and angle $\alpha$ decreasing. The shaded areas in FIG. 4 provide an example of how the A+, B+, C+ switch ON and OFF times might vary as the voltage vector 130 rotates between states 100 and 110.

A portion 432, 433, and 433' of period 400 may be spent in a null state (either 000 corresponding to all of switches A−, B−, C− being on or 111 corresponding to all of switches A+, B+, C+ being on) in which the three phase voltages A, B, and C shown in FIG. 2 add up to zero. Null state 000 may be chosen at portions 433, 433', for example, since the nearest state (100) at portions 420, 420' is predominately zero. Similarly, null state 111 may be chosen at portion 432, for example, since the nearest state (110) at portions 421, 421' is predominately one. As the amount of time out of period 400 spent in the null state increases (e.g., portions 432, 433, and 433' increase) the magnitude of vector 130 may decrease, i.e., the radius of circle 132 may get smaller. Conversely, as the amount of time out of period 400 spent in the null state decreases (e.g., portions 432, 433, and 433' decrease) the magnitude of vector 130 may increase, i.e., the radius of circle 132 may get larger, approaching some maximum, such as the radius of circle 134. The maximum may depend, for example, on voltage 108 on bus 106 or voltages at 160a, 160b, 160c of AC machine 102, or possibly on other electrical conditions of system 150.

Figure 5:
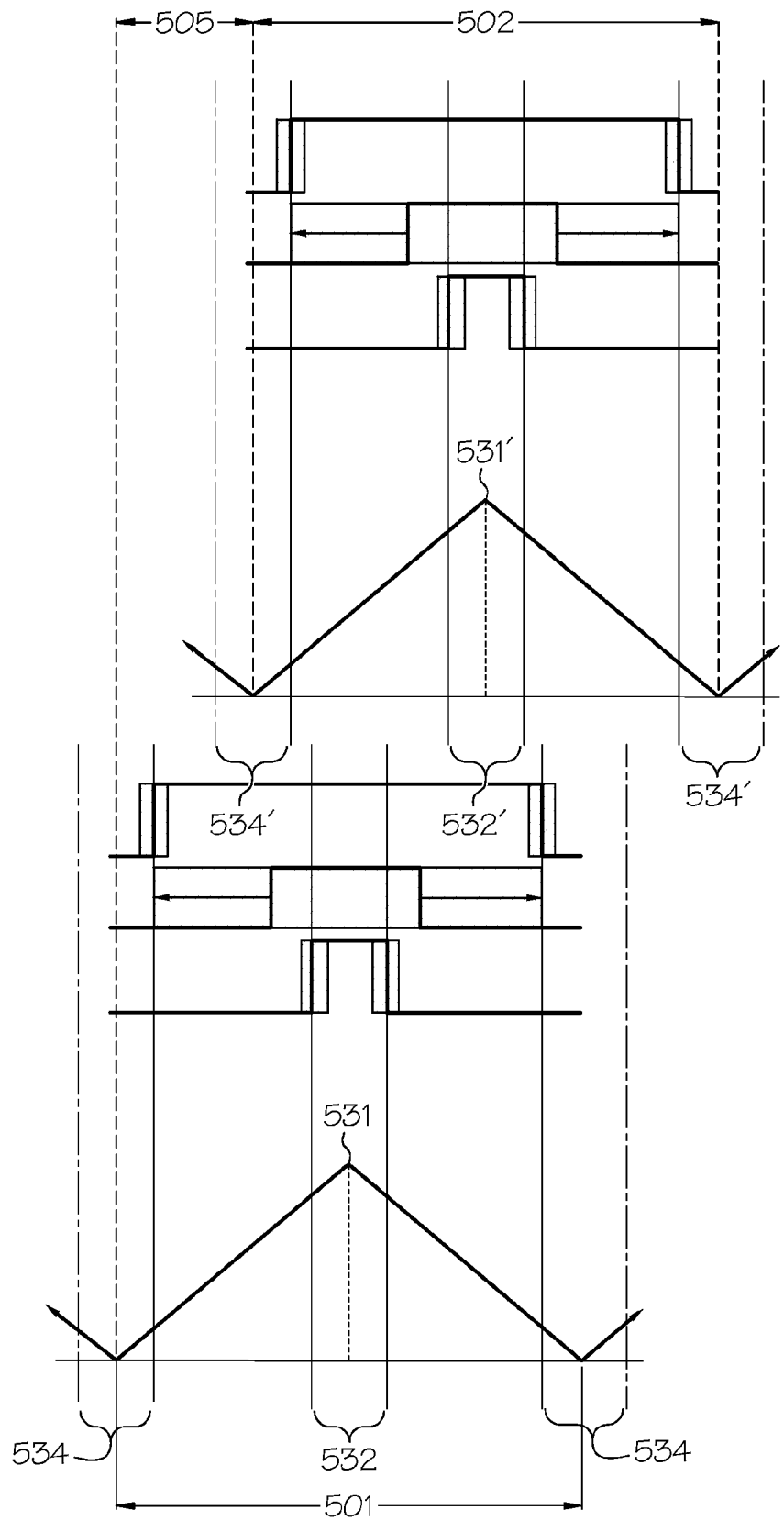
FIG. 5 is a voltage-time diagram showing phase offset of modulation cycles for two converters in accordance with one embodiment of the present invention.

FIG. 5 shows a first modulation frame 501 for a pulse width modulation scheme for space vector modulation of a first converter—such as converter 104 connected to bus 106 of FIG. 1—and a second modulation frame 502 for a pulse width modulation scheme for space vector modulation of a second converter—such as a converter 104' which may also be connected to the same bus 106 of FIG. 1 identically as converter 104 is connected but in a different location on bus 106. For purposes of the illustrative example, the description of FIG. 4 may be considered to apply to each of frames 501 and 502.

The transition of vectors 130 between 100 and 110 states shows that switch B+ may vary most as the voltage vector 130 rotates between states 100 and 110. Switches A+ and C+ may vary less and make minor adjustments to make the vector 130 follow the arc of the circle 132 as changes are made from one modulation frame 501 (and 502) to the next frame as time passes. Note that if the triangle waveform 404 is used as defining the pulse width modulation reference frame, switches A+, B+, and C+ in the inverter are switching ON and OFF (OFF and ON for switches A−, B−, and C−) once per frame 400. If the frame frequency is 20 kHz, current will be sourced from the DC bus 106 through the phase winding (e.g., of AC machine 102 or of AC machine 102' for the second converter 104' not shown in FIG. 1) to ground at 40 kHz. The ON and OFF times of the switches A+, B+, and C+ may be functions of the machine 102 electrical fundamental and machine 102 loading.

For the purposes of considering multiple machines 102 operating independently on the same bus 106, the switching times can be considered generally random. There remains, however, the periodicity of the midpoints 531, 531' of the null vectors 532, 534, and 532', 534'. To minimize DC bus voltage ripple, for two machines 102, 102' on the same DC bus 106, the respective controller pulse width modulation frames 501, 502 should be staggered (i.e., phase shifted by a phase shift 505) such that the null vectors (e.g., the portions 532, 534 having midpoint 531) of one controller do not overlap with the null vectors (e.g., the portions 532', 534' having midpoint 531') of the other controller. When this condition—referred to as "a null of one controller does not overlap a null of the other controller" or "a null of one controller overlaps a non-null of the other controller"—is forced to occur, the randomness of the switching may blur the periodicity of each of the nulls (periodicity of the midpoints 531, 531' of the null vectors 532, 534, and 532', 534'), especially when the nulls do not overlap. Thus, phase shifting the modulation frames 501 and 502 relative to each other by a non-zero amount that is not an integral multiple of $\pi$ (i.e., using FIG. 3 for reference, not an integral multiple of 180 degrees on circle 134) may reduce the DC bus voltage ripple from the DC bus 106. The same amount of phase shift may also be described as phase shifting by an amount that is either less than half or more than half of a single modulation period—such as modulation period 400 or modulation frame 501. The example shown in FIG. 5 illustrates using a $\pi/2$ phase shift 505 (i.e., 90-degrees displacement) for two machines 102, 102' connected to the DC bus 106 by controllers 104, 104'.

Different pulse width modulation schemes for producing the space vector modulation (e.g., of vector 130) may require different control approaches. With some schemes good results can be achieved at a predetermined phase shift (e.g., phase shift 505) between modulation frames (e.g., 501, 502) of different converters (e.g., 104, 104') that remains constant from one modulation period to the next. With some other modulation schemes the shift angles (such as phase shift 505) between multiple controllers may need to be constantly modified to achieve an optimal performance at different operating conditions. Different electrical variables such as DC currents, DC voltages, AC currents, AC voltages and voltage ripple across the DC bus 106 can be used for control purposes to maintain minimal ripple at any operating condition. These alternative embodiments of the present invention all may provide DC bus voltage ripple compensation based on phase shifting the pulse width modulation frame between converters with the ability to adjust the phase shift to different values.

Figure 6:
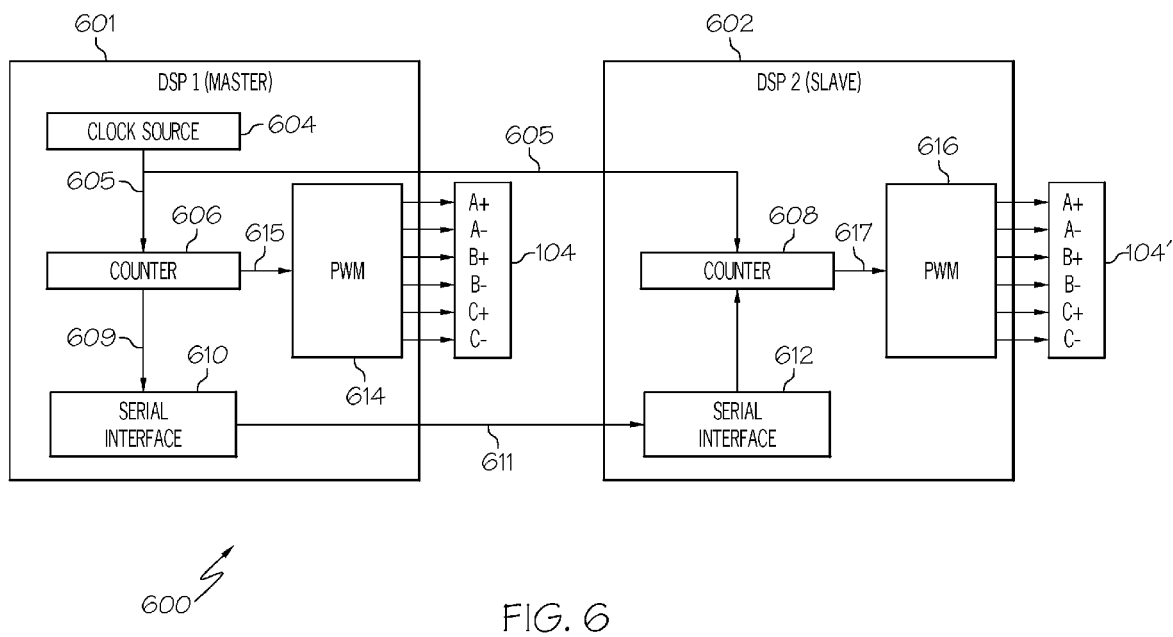
FIG. 6 is a system block diagram showing the interface between two digital signal processors (DSP) of two converters in accordance with one embodiment of the present invention.

FIG. 6 shows system 600 including two digital signal processors 601, 602 which may operate as controllers for two converters 104, 104', respectively, connected to the same DC power distribution bus, such as bus 106. Digital signal processor 601 (the master) may include a clock source 604 that generates a clock signal 605 that may be used internally to synchronize counter 606 and may also be used externally to synchronize the counter 608 in digital signal processor 602 (the slave). By sharing a single clock signal 605, the two converters 104, 104' may have identical modulation frequencies (equivalently, equal modulation periods) synchronized together with the ability to phase shift the modulation periods of the second (and third, fourth, and so on, in the case of more than two converters) converters in relation to the first. A master/slave(s) arrangement, as shown by FIG. 6, may be a very straightforward approach for synchronizing multiple controllers such as DSP 601 and 602, but other approaches known in the art could be used.

DSP 601 may compute the phase shift (e.g., phase shift 505) desired between the two converters 104, 104'. DSP 601 may read the present value 609 of its own counter 606 and add or subtract an offset count representing the phase shift (e.g., phase shift 505). DSP 601 may then transmit data 611, which may include the counter value 609 and the offset count, for example, using the serial interface 610 to DSP 602, which may receive the data 611 using serial interface 612. The exchange of data 611 could also be accomplished by other means such as a parallel interface using dual-port RAM, for example. When DSP 602 receives the data 611, DSP 602 may write the received counter value 609 into a register in its counter 608. The latency effect that may be incurred due to DSP software processing and the serial interface 610, 612 delay can be compensated for by DSP 602 adding an additional fixed offset to the counter value 609, for example. DSP 601 may include a PWM generator 614, and DSP 602 may include a PWM generator 616. The counter value 615 may establish timing for the modulation frames of PWM generator 614 for synchronization of the modulation periods (e.g. 501, 502) from the master DSP 601 to the all the slave digital signal processors of system 600, e.g., DSP 602. The counter value 617 may establish timing for the modulation frames of PWM generator 616 for synchronization and phase shifting of the modulation period 502 of slave DSP 602 relative to master DSP 601. In the case of multiple slave digital signal processors, each may be synchronized and have its own distinct phase shift relative to the master DSP 601.

In alternative embodiments, other types of digital signal processors may contain two PWM generators and can drive two high power switched modules (HPSM), for example, both converter 104 and converter 104' could be driven from such a single digital signal processor. In this case, the serial interface 610, 612 can be eliminated and the time delay between reading the first counter and writing to the second counter may be negligible.

Figure 7:
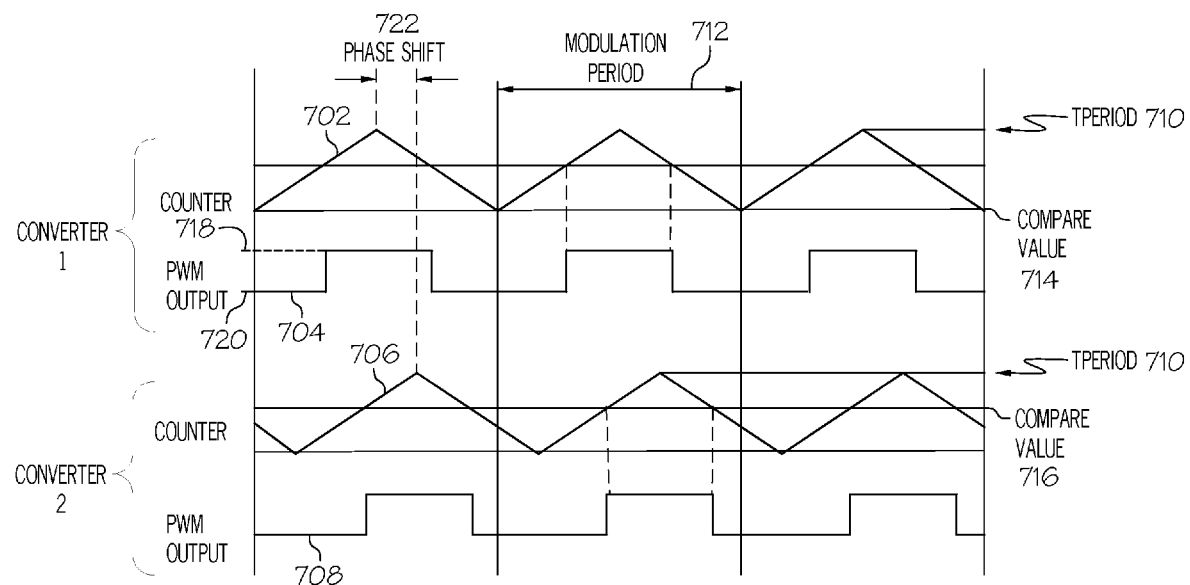
FIG. 7 is a voltage-time diagram showing the modulation waveforms for a two-converter system in accordance with one embodiment of the present invention.

FIG. 7 shows exemplary modulation waveforms for the two-converter system 600. The upper two waveforms 702, 704 provide an example for a first DSP and converter—e.g., DSP 601 and converter 104—labeled as Converter 1 in FIG. 7 and the lower two waveforms 706, 708 provide an example for a second DSP and converter—e.g., DSP 602 and converter 104'—labeled as Converter 2 in FIG. 7. The PWM generators 614, 616 may employ digital logic in the form of an up/down counter and a period register to create, respectively, the triangular waveforms 702 and 706. The triangular waveforms 702, 706 may be created, for example, by counters 606, 608 feeding counter values 615, 617 to PWM generators 614, 616 that count up from zero to the value of Tperiod 710 and then count back down to zero. By using the same clock source 604 for the counters 606, 608 and the same Tperiod 710 value for both the triangular waveforms 702 and 706, the modulation periods 712 of both triangular waveforms 702 and 706 may be synchronized.

Pulse width modulation waveforms 704, 708 may be created, respectively, using the triangular waveforms 702 and 706. Referring only to the first converter/controller DSP 601, the description for DSP 602 being parallel: a pulse width waveform is needed for each of the switches A+, B+, and C+ as indicated in FIG. 6 at converter 104, the switches A−, B−, and C− being complementary as described in relation to FIG. 1 and FIG. 4. For simplicity and brevity of description, the pulse width waveform 704 may represent any of the three different waveforms for A+, B+, and C+. Three compare registers, one for each of A+, B+, and C+, in PWM generator 614 may be loaded with duty cycle values computed by the DSP. The duty cycle value may correspond to the on-time for the switch, either A+, B+, or C+, to which pulse width waveform 704 corresponds. Thus, the duty cycle value for B+, say, may change (or establish) the on-time of switch B+, as in the example given by FIG. 4, and change (or establish) the position of space vector 130 in order to modulate space vector 130. The duty cycle value for pulse width waveform 704 may be referred to as compare value 714. The compare value 716 for pulse width waveform 708 may be the same or different from compare value 714.

When the counter value 615 exceeds the compare value 714 the PWM output 718 may be high (waveform 704 is high) and conversely, when the compare value 714 exceeds the counter value 615 the PWM output 720 may be low (waveform 704 is low). In a hardware implementation, for example, the compare registers may be compared to the counter value 615, and on/off logic outputs may be generated to drive the six switches A+, A−, B+, B−, C+, and C− (see FIG. 6 and FIG. 1) in an HPSM 104.

To produce the phase shift 722 from waveform 702 to waveform 704 between the two counters 606, 608, the counter 608 counter value 617 may be modified by adding or subtracting an offset count value. For the example illustrated in FIG. 7, the value of the compare values 714 and 716 have been drawn as identical to illustrate more clearly the phase shift 722 as between the two PWM waveforms 704 and 708. In general, however, the compare values 714 and 716 would not be the same, as for example, there could be a distinct space vector 130 being modulated at each of DSP 601 and DSP 602. In various implementations, motion control digital signal processors may have the PWM generation circuitry internally integrated to simplify the phase shift mechanization. Alternatively, logic circuits external to the DSP such as a complex programmable logic device (CPLD) or field programmable gate array (FPGA) could be used.

Figure 8:
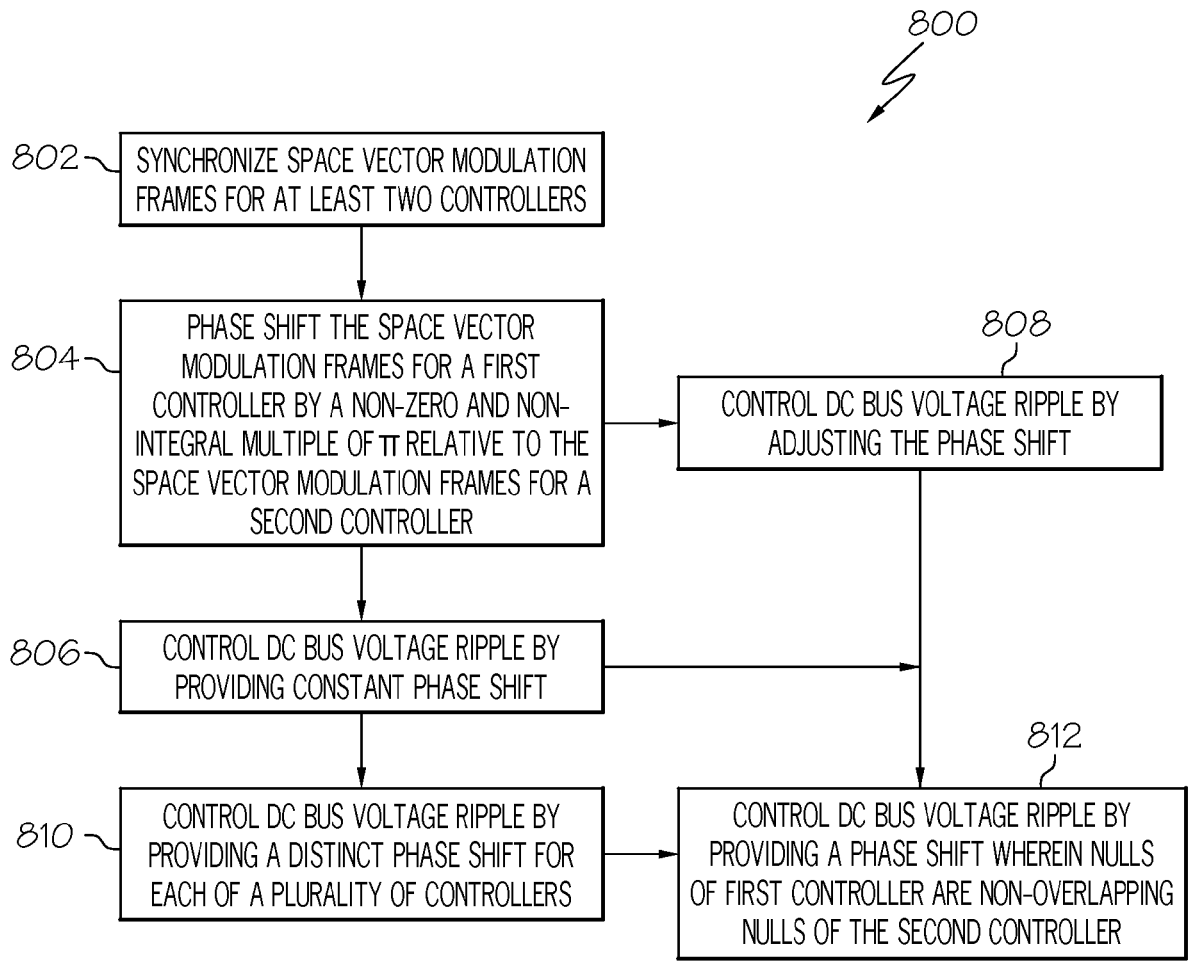
FIG. 8 is a flowchart of a method for DC bus voltage ripple compensation in accordance with one embodiment of the present invention.

FIG. 8 illustrates method 800 for DC bus voltage ripple compensation, i.e., controlling voltage fluctuation on a DC power distribution bus—such as bus 106. While the examples presented generally describe embodiments with two converters, the examples may be extended within ordinary skill in the art to embodiments having more than two converters.

Method 800 may include a step 802 to synchronize space vector modulation frames (e.g., frames 501, 502 or frames 712) for at least two controllers (e.g., DSP 601, DSP 602), for example, by synchronizing triangular waveforms 702, 706 using counters 606, 608 synchronized from a single clock source 604. Such synchronization, thus, may be performed by software residing in digital signal processors—such as DSP 601 and DSP 602.

Method 800 may include a step 804 to phase shift the space vector modulation frames for a first controller by a non-zero and non-integral multiple of π relative to the space vector modulation frames for a second controller. For example, triangular waveform 706 may be shifted relative to triangular waveform 702 using an offset value added to counter value 617. Step 804 may include controlling a first converter—such as converter 104—connected to a DC bus—such as bus 106—with the first controller, e.g., DSP 601 and controlling a second converter—such as converter 104'—connected to the same DC bus, e.g., bus 106, with the second controller, e.g., DSP 602. The phase shifting step 804 may also be performed by software residing in digital signal processors—such as DSP 601 and DSP 602.

Method 800 may include a step 806 of controlling DC bus voltage ripple by providing a constant phase shift between modulation frames for two converters, e.g., modulation frames 712, for example, by providing an offset value added to counter value 617 that does not change from one modulation period 712 to the next as time passes. DC bus voltage ripple may be shown to be controlled by the "EXAMPLE" provided. Step 806 may also be performed by software residing in digital signal processors—such as DSP 601 and DSP 602.

Method 800 may include a step 808 of controlling DC bus voltage ripple by adjusting the phase shift between modulation frames for two converters, e.g., modulation frames 712. The phase shift 722, for example, may be adjusted from one modulation from to the next as time passes (as opposed to providing a constant phase shift as in step 806) by providing an offset value added to counter value 617 that changes from one modulation period 712 to the next as time passes. DC bus voltage ripple may be shown to be controlled by the "EXAMPLE" provided. Step 808 may also be performed by software residing in digital signal processors—such as DSP 601 and DSP 602.

Method 800 may include a step 810 of controlling DC bus voltage ripple by providing a distinct constant phase shift between modulation frames for any two converters out of a multiplicity of converters, e.g., modulation frames 712, for example, by providing a distinct offset value added to the counter value (e.g. counter value 617) that is unique to each slave converter and different from the offset value for all other slave converters in a system such as system 150 where a plurality of converters 104 are connected to the same bus 106. Step 810 may be performed by software residing in a digital signal processors—such as DSP 601—where a DSP is provided as a controller for each of the converters 104.

Method 800 may include a step 812 of controlling DC bus voltage ripple by providing a phase shift between modulation frames for two converters, e.g., modulation frames 712, for example, by providing an offset value added to counter value 617. The phase shift may be non-zero and may be other than any integral multiple of π, referring to phase shift by the angle of the phase shift in phase space—such as the phase space shown in FIG. 3. The phase shift may adjusted so that either the nulls of a first controller (e.g., DSP 601) are non-overlapping the nulls of the second controller (e.g., DSP 602) or so that some portion of the nulls of the first controller overlap the non-nulls of the second controller. DC bus voltage ripple may be shown to be controlled by the "EXAMPLE" provided below. Step 812 may be performed by software residing in digital signal processors—such as DSP 601 and DSP 602.

EXAMPLE

Figure 9A:
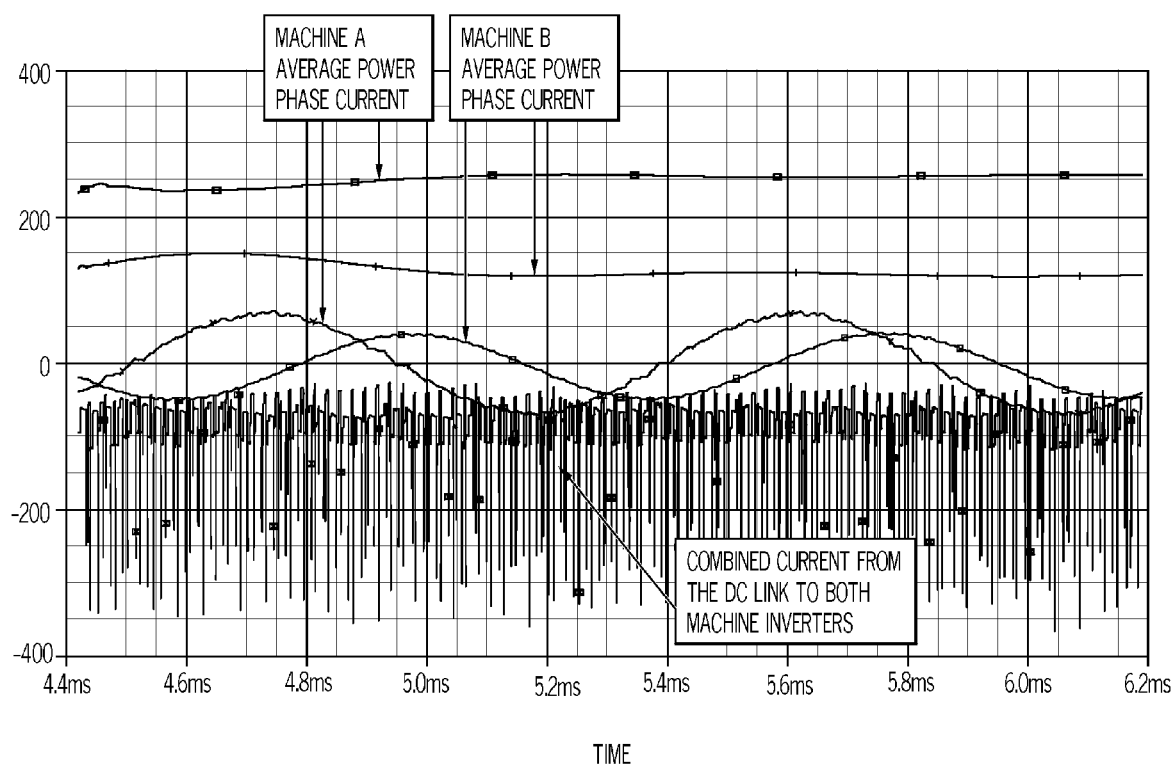
FIGS. 9A and 9B are voltage-time diagrams for an example showing in-phase (no phase shift) pulse width modulation (PWM) waveforms (FIG. 9A) and 90-degree out-of-phase PWM waveforms (FIG. 9B) according to an embodiment of the present invention.
Figure 9B:
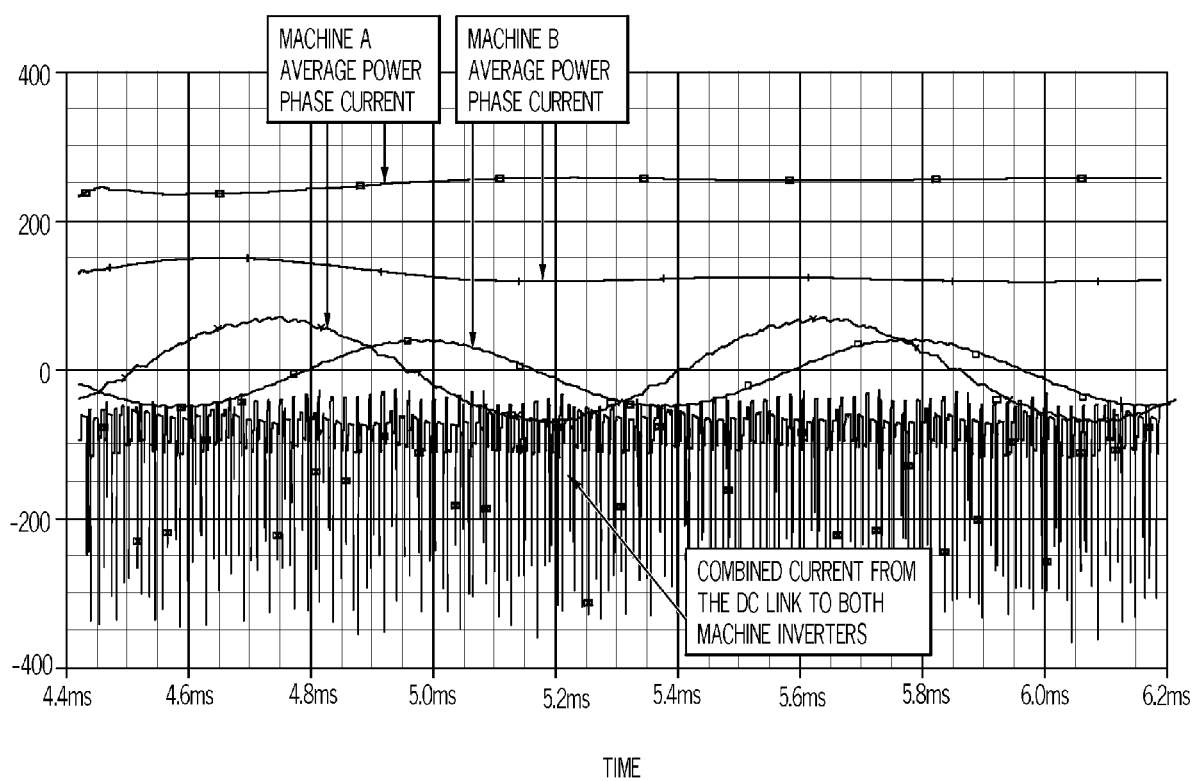
Figure 9C:
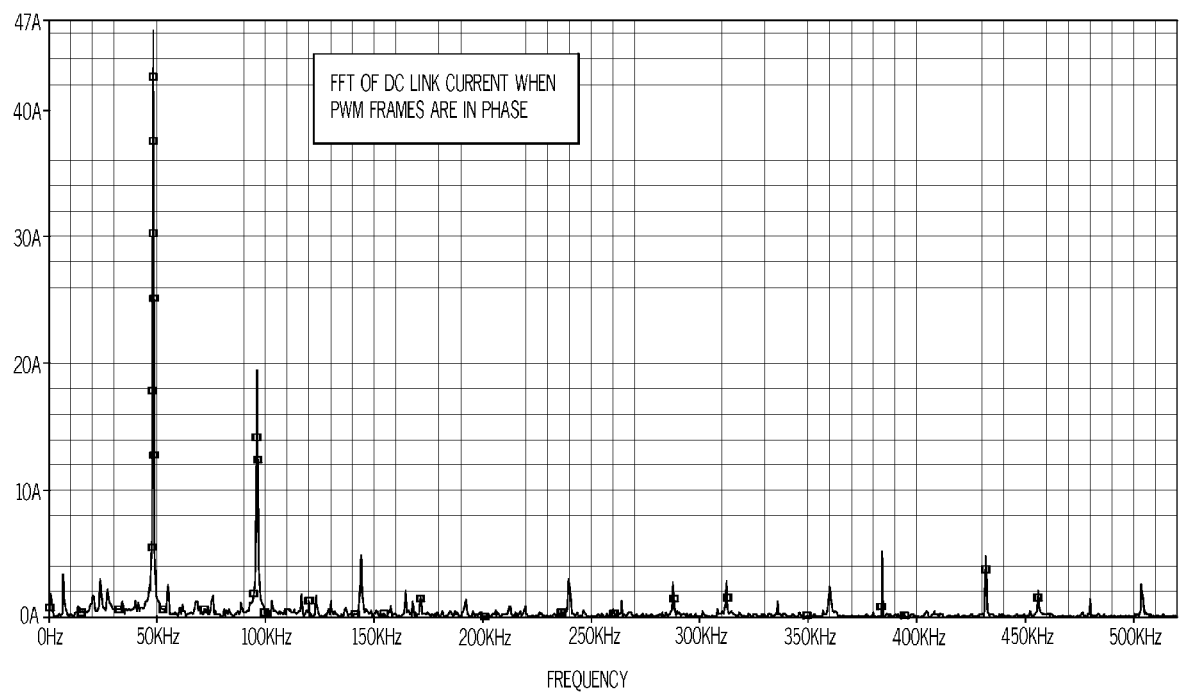
FIGS. 9C and 9D are voltage-frequency diagrams showing in-phase PWM DC link current (FIG. 9C, relating to FIG. 9A) and 90-degree out-of-phase PWM DC link current (FIG. 9D, relating to FIG. 9B).
Figure 9D:
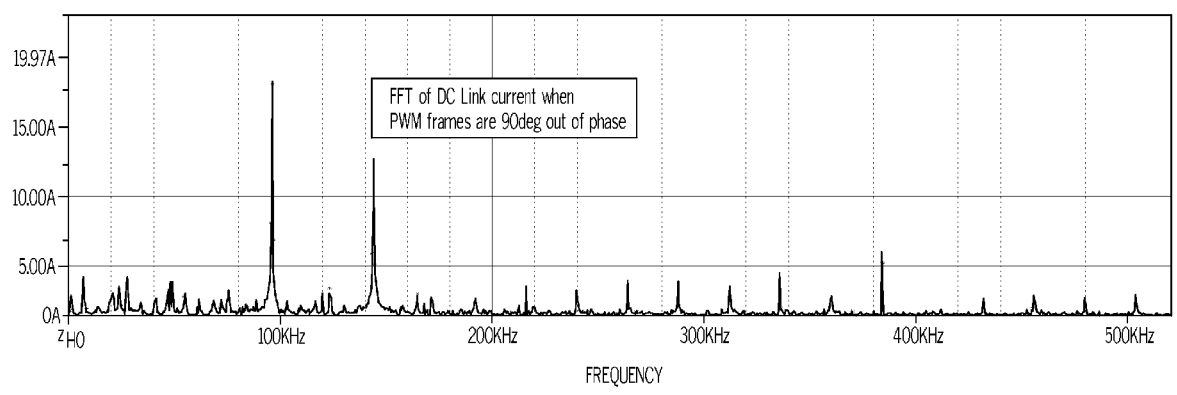

FIGS. 9A and 9B are voltage-time diagrams for an example showing in-phase (zero phase shift) PWM waveforms (FIG. 9A) and 90-degree out-of-phase PWM waveforms (FIG. 9B). FIGS. 9C and 9D are voltage-frequency diagrams showing in-phase PWM DC link current (FIG. 9C, relating to FIG. 9A) and 90-degree out-of-phase PWM DC link current (FIG. 9D, relating to FIG. 9B).

A simulation of method 800 was performed for a system with two converters (e.g., converters 104, 104') connected to the same DC bus (e.g. bus 106). One controller (e.g., DSP 601) simulates driving a permanent-magnet (PM) machine (e.g. AC machine 102) delivering approximately 24 kilowatts (kW), and a second controller (e.g., DSP 602) simulates driving another PM machine (e.g. AC machine 102') at approximately 12 kW. The simulation was performed for two cases. Case 1 had the pulse width modulation cycles of the two controllers in phase with each other (FIGS. 9A and 9C). Case 2 had the PWM cycles 90 degrees ($\pi/2$) phase shifted (FIGS. 9B and 9D).

The simulation demonstrated the use of PWM phase shift between machine controllers using space vector modulation, which reduced the typical fundamental three-switch SVM AC current amplitude in the DC bus. The effect of shifting the PWM 90 degrees between controllers using a 24-kHz PWM reduced the (fundamental) 48-kHz current harmonic from the DC bus from 46 Amps peak to less than 5 Amps peak, roughly a factor of 10, or order of magnitude, reduction. The 96-kHz harmonic remained about the same, while the 144 kHz harmonic increased from 5 to 12.5 Amps. The reduction of the lowest frequency (48-kHz) harmonic ten times creates opportunity to reduce the capacitance bank and other frequency dependent components substantially. The effect of the smaller increase of the 144-kHz harmonic can be mitigated more easily with much smaller components.

It should be understood, of course, that the foregoing relates to exemplary embodiments of the invention and that modifications may be made without departing from the spirit and scope of the invention as set forth in the following claims.

We claim:

1. A power conversion system having a DC power distribution bus, comprising:
a first converter and a second converter, each connected to the DC power distribution bus;
a first controller connected to the first converter and controlling the first converter using space vector modulation modulating space vector modulation frames associated with an output signal of the first converter;
a second controller connected to the second converter and controlling the second converter using space vector modulation modulating space vector modulation frames associated with an output signal of the second converter, wherein:
the second controller space vector modulation frames are synchronized to the first controller space vector modulation frames; and
the second controller space vector modulation frames are phase shifted relative to the first controller space vector modulation frames.

2. The system of claim 1, wherein:
the second controller space vector modulation frames are phase shifted by a non-zero phase shift that is not an integral multiple of 180 degrees.

3. The system of claim 1, wherein:
the second controller space vector modulation frames have a constant phase shift from the first controller space vector modulation frames.

4. The system of claim 1, wherein:
the second controller space vector modulation frames have a changing phase shift from the first controller space vector modulation frames.

5. The system of claim 1, wherein:
the first controller implements space vector modulation using a first pulse width modulation of the first converter; and
the second controller implements space vector modulation using a second pulse width modulation of the second converter so that nulls of the first converter overlap non-nulls of the second converter.

6. The system of claim 1, wherein:
the first controller is a digital signal processor that synchronizes the space vector modulation frames using a clock source to synchronize a counter and phase shifts the space vector modulation frames by adjusting a value of the counter.

7. A method of compensating voltage ripple, comprising the steps of:
synchronizing space vector modulation frames for at least two controllers, a first controller controlling a first converter and a second controller controlling a second converter, wherein the first and second converters are connected to a DC power distribution bus; and
phase shifting the space vector modulation frames for the first controller by a non-zero and non-integral multiple of $\pi$ relative to the space vector modulation frames for the second controller.

8. The method of claim 7, wherein:
the phase shifting reduces a first harmonic of AC current amplitude from the DC power distribution bus compared to no phase shifting.

9. The method of claim 7, wherein:
the synchronizing step includes:
synchronizing a first counter and a second counter to a clock source; and
transmitting a present value of the first counter to the second counter; and
the phase shifting step includes:
adding an offset to the present value; and
transmitting the offset to the second counter.

10. The method of claim 7, wherein the phase shifting step includes:
phase shifting by either less than half or more than half of a modulation frame.

11. The method of claim 7, further comprising the steps of:
controlling the first converter using pulse width modulation;
controlling the second converter using pulse width modulation; and
the phase shifting step includes:
phase shifting so that the nulls of the first converter do not overlap the nulls of the second converter.

12. A method for power conversion on a DC power distribution bus, comprising:
converting power at a first connection to the bus;
converting power at a second connection to the bus;
synchronizing the power conversion at the second connection to the power conversion at the first connection; and
phase shifting the power conversion at the second connection by a non-zero amount and non-integral multiple of $\pi$ relative to and to be out of phase with the power conversion at the first connection.

13. The method of claim 12, further comprising:
converting power at the first connection using a first space vector modulation;
converting power at the second connection using a second space vector modulation having modulation cycles synchronized to modulation cycles of the first space vector modulation; and controlling DC bus voltage ripple by providing a constant phase shift from the modulation cycles of the first space vector modulation to the modulation cycles of the second space vector modulation.

14. The method of claim 12, further comprising:

converting power at the first connection using a first space vector modulation;

converting power at the second connection using a second space vector modulation having modulation cycles synchronized to modulation cycles of the first space vector modulation; and controlling DC bus voltage ripple by adjusting the phase shift from the modulation cycles of the first space vector modulation to the modulation cycles of the second space vector modulation.

15. The method of claim 12, further comprising:

converting power at a third connection to the bus;

synchronizing the power conversion at the third connection to the power conversion at the first connection;

converting power at the first connection using a first space vector modulation;

converting power at the second connection using a second space vector modulation having modulation cycles synchronized to modulation cycles of the first space vector modulation;

converting power at the third connection using a third space vector modulation having modulation cycles synchronized to modulation cycles of the first space vector modulation; and controlling DC bus voltage ripple by providing a distinct phase shift from the modulation cycles of the first space vector modulation for each of the modulation cycles of the second space vector modulation and the modulation cycles of the third space vector modulation.

16. The method of claim 12, further comprising:

converting power at the first connection using a first space vector modulation;

converting power at the second connection using a second space vector modulation having modulation cycles synchronized to modulation cycles of the first space vector modulation; and controlling DC bus voltage ripple by providing a phase shift wherein nulls of the first space vector modulation are non-overlapping nulls of the second space vector modulation.

\* \* \* \* \*